H. H. EDGERTON.

Register for Gas-Meters.

No. 6,253. Reissued Jan. 26, 1875.

*Witnesses.*

Ewell A. Dick

W. T. Hutchinson

*Inventor:*

Henry H. Edgerton by atty A. Pollok

THE GRAPHIC CO. PHOTO-LITH. 39 & 41 PARK PLACE, N.Y.

UNITED STATES PATENT OFFICE.

HENRY H. EDGERTON, OF FORT WAYNE, INDIANA.

IMPROVEMENT IN REGISTERS FOR GAS-METERS.

Specification forming part of Letters Patent No. 118,221, dated August 22, 1871; reissue No. 6,253, dated January 26, 1875; application filed December 24, 1874.

*To all whom it may concern:*

Be it known that I, HENRY H. EDGERTON, of Fort Wayne, in the county of Allen and State of Indiana, have invented new and useful Improvements in Registers for Gas-Meters, of which the following is a specification:

The object of my invention is to register the consumption of gas, not by indicating the quantity of gas consumed, but by indicating the value in dollars and cents. In doing this, however, it is necessary to provide means whereby the accuracy of the meter can be proved. To this end my register consists of a series of value-registering indexes and dials, in combination with a proving hand or index, which is at once a unit of measure and of value, substantially as hereinafter described. I also combine, in a meter which registers the value of the gas consumed, means, hereinafter described, whereby registrations varying according to different values placed upon the gas may be obtained without any change in the registering-train proper.

The manner in which my invention is or may be carried into effect will be understood by reference to the accompanying drawing, in which—

Figure 1:
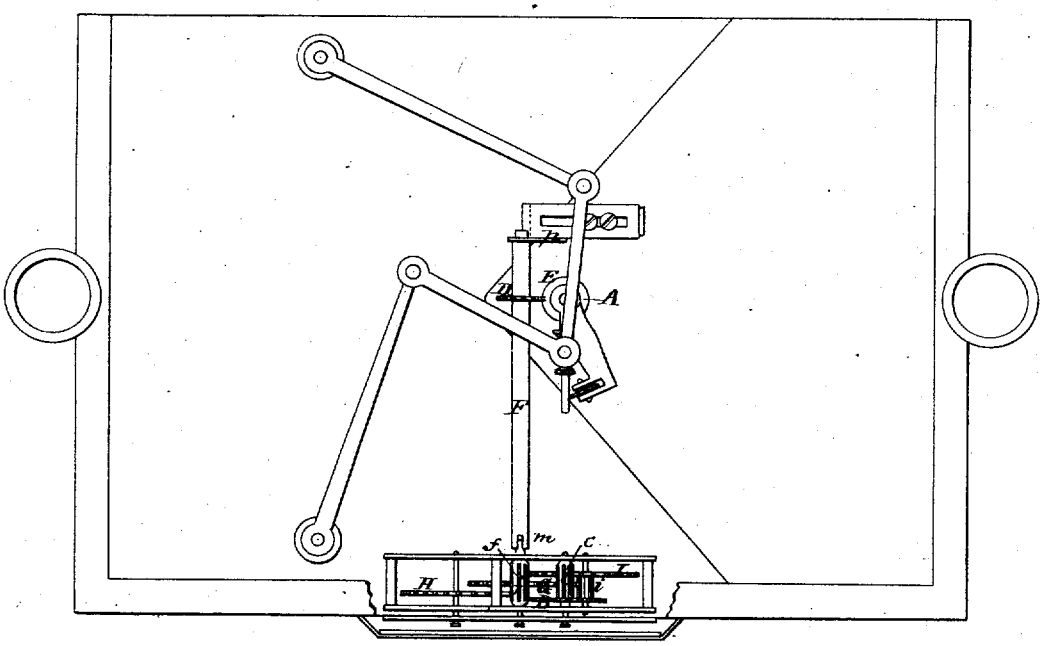
Figure 2:
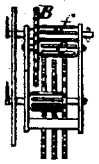
Figure 3:
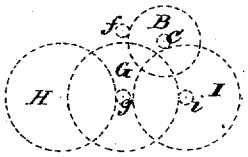
Figure 4:
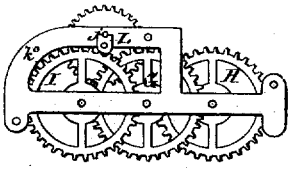
Figure 5:
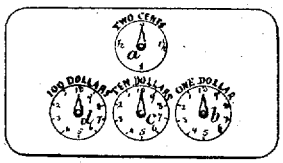
Figure 6:
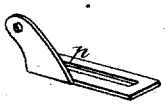
Figure 7:
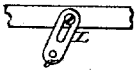

Figure 1 is a plan view of a meter made in accordance with my invention. Fig. 2 is an end elevation of the registering apparatus. Fig. 3 indicates the position occupied by the cog-wheels and pinions of the registering apparatus, looking at the same from the front. Fig. 4 is a rear view of the gearing and frame of said apparatus. Fig. 5 is a front view of the dial-plate. Figs. 6 and 7 are views of detached parts, which will be hereinafter referred to.

The meter represented in the drawing is one in which a complete revolution, or a filling and emptying, of the meter-diaphragms delivers one-sixth cubic foot of gas. The revolution of the spindle A, Fig. 1, then indicating one-sixth of a cubic foot per revolution, and gearing by the endless screw E into the cog-wheel D, having twelve cogs, one entire revolution of the shaft F will represent two cubic feet; and supposing the rate agreed upon be ten dollars per one thousand cubic feet, the index of the dial *a*, Fig. 5, will, being directly attached to the shaft F, indicate two cents. The index and dial *a* are the proving index and dial; they constitute the unit at once of value and of measure, and by the same the accuracy of the meter can be tested and ascertained. The shaft F gears, by a pinion, *f*, of six cogs, into the wheel B, Fig. 3, of thirty-six cogs; consequently one revolution of B indicates ten cents. Upon the same axis with the wheel B is the pinion C of six cogs, which gears into the wheel I of sixty cogs, so that one revolution of the latter represents one hundred cents, or one dollar, as shown by the dial *b*, a revolution of whose index indicates one dollar. The pinion *i* of six cogs, on the axis of the wheel I, gearing into the wheel G of sixty cogs, and to which is attached the index of the dial *c*, indicates by one revolution ten dollars. The index of the dial *d* indicates one hundred dollars in the same manner, the pinion *g* of six cogs, on the axis of wheel G, gearing into the wheel H of sixty cogs, with which the index of dial *d* is connected.

Under the above arrangement it will be noted that, the proving hand or index *a* being a unit of both value and measure, the value registered by the dollar-dials can at once be translated into the quantity of gas consumed.

I have described the meter as adapted to indicate the amount of gas consumed in dollars and cents at the rate of ten dollars per one thousand feet; but it is, of course, desirable that the meter should be so arranged as to permit of the rate of valuation being changed, so that the meter may register the value in accordance with any price agreed upon. To this end I make the shaft F removable or adjustable, uniting it with the axis of the pinion *f* by a universal or equivalent joint, as shown at *m*, and mounting it at the other end in an adjustable or sliding bearing, *p*. (Shown detached in Fig. 6.) The shaft can thus be adjusted toward or away from the worm E, according to the size of the gear which it carries; and by substituting for the wheel D a wheel with any number of teeth the rate of movement of the registering apparatus can be varied and changed. For instance, the indication, at the rate of five dollars per one thousand cubic feet, can be effected by removing the adjustable bearing *p*, taking off the cog-wheel D of twelve cogs, and replacing on the same shaft one of twenty-four cogs, of such a pitch as to gear sufficiently well into the worm E. The whole system of indexes will then indicate dollars and cents at five dollars per one thousand cubic feet.

In a like manner any other determined-upon price can be registered in the same manner, limited only by the number of cogs that will gear sufficiently well into the endless screw E. The shaft F, being adjustable at both ends, allows whatever wheel is placed on it to be fitted accurately in proper position opposite to, and so as to gear with, the worm.

It now remains to describe the application of this invention to existing meters. The registration is first reduced to ten dollars per thousand in the following manner: The mode of alteration may best be understood by reference to Fig. 4. Before alteration the axis of the wheel B moved in the hole *j*, Fig. 4, and pinion C did not gear directly into the wheel I, but into a wheel of sixty cogs, whose axis rested in the hole *k*, and whose pinion of six cogs geared into the wheel I, thereby revolving the wheel I once for ten dollars, or one thousand cubic feet, in place of once for one dollar, or one hundred cubic feet. In order to cause the registration to be altered to the rate last mentioned, I entirely remove the wheel running in the hole K, and drop the wheel B by means of the piece L, in which it has its bearing at *o*, Fig. 7, until its six-cog pinion C gears into the wheel I, thereby causing the meter to register dollars and cents at ten dollars per thousand cubic feet, as described.

By this means, with little expense and trouble, I can alter existing meters so that they will register according to the new mode herein specified.

Having described my invention, and the manner in which the same is or may be carried into effect, what I claim, and desire to secure by Letters Patent, is—

1. A value-register for gas-meters, comprising a series of dollar or value registering dials and indexes, in combination with a proving hand or index, which is at once the unit of value and the unit of measure, substantially as herein shown and set forth.

2. In a gas-meter registering the value of the gas consumed in dollars and cents, the combination, with the registering-train proper and the wheel on the spindle receiving motion from the diaphragms, of means, substantially as herein shown and described, whereby registrations varying according to different values may be obtained without change or alteration in the registering-train.

In testimony whereof I have hereunto signed my name this 19th day of December, A. D. 1874.

HENRY H. EDGERTON.

Witnesses:
EWELL A. DICK,
HENRY R. ELLIOTT.